US008633263B2

(12) United States Patent
Jing et al.

(10) Patent No.: US 8,633,263 B2
(45) Date of Patent: Jan. 21, 2014

(54) COATING COMPOSITION AND METHOD OF MAKING AND USING THE SAME

(75) Inventors: Naiyong Jing, Woodbury, MN (US);
Yifan Zhang, Woodbury, MN (US);
Justin A. Riddle, St. Paul, MN (US);
Elaine M. Yorkgitis, St. Paul, MN (US);
Michelle L. Legatt, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 179 days.

(21) Appl. No.: 13/201,288

(22) PCT Filed: Mar. 16, 2010

(86) PCT No.: PCT/US2010/027452
§ 371 (c)(1),
(2), (4) Date: Aug. 12, 2011

(87) PCT Pub. No.: WO2010/114700
PCT Pub. Date: Oct. 7, 2010

(65) Prior Publication Data
US 2012/0010327 A1 Jan. 12, 2012

Related U.S. Application Data

(60) Provisional application No. 61/164,986, filed on Mar. 31, 2009.

(51) Int. Cl.
*C08K 9/00* (2006.01)

(52) U.S. Cl.
USPC ............ 523/205; 523/216; 523/223; 523/234

(58) Field of Classification Search
USPC ........................................ 523/205, 223, 334
See application file for complete search history.

(56) References Cited

U.S. PATENT DOCUMENTS

| | | | |
|---|---|---|---|
| 1,014,802 A | 1/1912 | Boche | |
| 3,316,190 A | 4/1967 | Suzumura et al. | |
| 3,700,487 A | 10/1972 | Crandon et al. | |
| 3,773,776 A | 11/1973 | Iler | |
| 3,940,359 A | 2/1976 | Chambers | |
| 4,152,165 A | 5/1979 | Langager et al. | |
| 4,338,377 A | 7/1982 | Beck et al. | |
| 4,576,864 A | 3/1986 | Krautter et al. | |
| 4,600,735 A | 7/1986 | Larsson et al. | |
| 5,073,404 A | 12/1991 | Huang | |
| 5,286,782 A | 2/1994 | Lamb et al. | |
| 5,354,797 A | 10/1994 | Anderson et al. | |
| 5,723,175 A | 3/1998 | Scholz et al. | |
| 5,820,978 A | 10/1998 | Huang | |
| 5,939,182 A | 8/1999 | Huang et al. | |
| 6,096,469 A | 8/2000 | Anderson et al. | |
| 6,251,523 B1 | 6/2001 | Takahashi et al. | |
| 6,428,898 B1 | 8/2002 | Barsotti et al. | |
| 6,544,593 B1 | 4/2003 | Nagata et al. | |
| 6,727,309 B1 | 4/2004 | Paiva et al. | |
| 7,066,998 B2 | 6/2006 | Rohrbaugh et al. | |
| 7,112,621 B2 | 9/2006 | Rohrbaugh et al. | |
| 7,196,043 B2 | 3/2007 | Valpey, III et al. | |
| 7,267,728 B2 | 9/2007 | Barger et al. | |
| 7,957,621 B2 | 6/2011 | Zhang et al. | |
| 7,973,096 B2 | 7/2011 | Anderson et al. | |
| 2004/0034157 A1 | 2/2004 | Ghosh et al. | |
| 2005/0239674 A1 | 10/2005 | Dreja et al. | |
| 2006/0204655 A1 | 9/2006 | Takahashi | |
| 2008/0153963 A1 | 6/2008 | Baran et al. | |
| 2009/0048571 A1 | 2/2009 | Catalan et al. | |
| 2010/0035039 A1 | 2/2010 | Jing et al. | |
| 2010/0092765 A1 | 4/2010 | Hager et al. | |
| 2010/0150513 A1 | 6/2010 | Zhang et al. | |
| 2011/0028591 A1 | 2/2011 | Anderson et al. | |
| 2011/0033694 A1 | 2/2011 | Jing et al. | |

FOREIGN PATENT DOCUMENTS

| | | |
|---|---|---|
| CN | 1517411 | 8/2004 |
| EP | 0 685 508 | 12/1995 |
| EP | 0 823 450 | 2/1998 |
| GB | 983128 | 2/1965 |
| GB | 1 014 802 | 12/1965 |
| JP | 56-112984 A | 9/1981 |
| JP | 7-53728 A | 2/1995 |
| JP | 2877520 B | 3/1999 |
| JP | 2001-106791 A | 4/2001 |
| KR | 10-2007-0014627 | 2/2007 |
| WO | WO 2007/068870 | 6/2007 |
| WO | WO 2007/068939 | 6/2007 |
| WO | WO 2008/028640 | 3/2008 |
| WO | WO 2009/085680 | 6/2009 |
| WO | WO 2009/137188 A1 | 11/2009 |
| WO | WO 2009/140482 A1 | 11/2009 |
| WO | WO 2010/077521 | 7/2010 |
| WO | WO 2010/114698 | 10/2010 |

(Continued)

OTHER PUBLICATIONS

Co-pending U.S. Appl. No. 13/201,288, 371(c) date Aug. 12, 2011.
Co-pending U.S. Appl. No. 13/378,182, 371(c) date Dec. 14, 2011.
International Search Report, PCT/US2010/027452, mailed Nov. 6, 2010, 4 pages.
Written Opinion of the International Searching Authority, PCT/US2010/027452, mailed Nov. 6, 2010, 5 pages.
Percy et al., "Synthesis and Characterization of Vinyl Polymer-Silica Colloidal Nanocomposites", Langmuir, 2000, 16 (17), pp. 6913-6920, published on the web Jul. 29, 2000.

(Continued)

*Primary Examiner* — Edward Cain
(74) *Attorney, Agent, or Firm* — Bradford B. Wright

(57) ABSTRACT

Compositions include an aqueous continuous liquid phase and core-shell particles dispersed in the aqueous continuous liquid phase. Each core-shell particle includes a polymer core surrounded by a shell consisting essentially of nonporous spherical silica particles disposed on the polymer core, wherein the nonporous spherical silica particles have a volume average particle diameter of 60 nanometers or less. Methods of making and using the compositions to coat a substrate are also disclosed.

14 Claims, 1 Drawing Sheet

(56) References Cited

FOREIGN PATENT DOCUMENTS

| WO | WO 2010/114700 | 10/2010 |
|----|----------------|---------|
| WO | WO 2010/129726 | 11/2010 |
| WO | WO 2010/135140 | 11/2010 |
| WO | WO 2011/002838 | 1/2011  |

OTHER PUBLICATIONS

Duguet et al., "From Raspberry-like to Dumbbell-like Hybrid Colloids through Surface-assisted Nucleation and Growth of Polystyrene Nodules onto Macromonomer-modified Silica Nanoparticles", Master. Res. Soc. Symp. Proc. vol. 847, 2005, pp. EE1.1.1-EE1.1.10.
Ming, "Easy-to-Clean Coatings", Materials Science Program Nanostructured Polymers Research Center University of New Hampshire Durham, NH, Am Coat Conference, Jun. 2-4, 2008, 29 pages.
Song et al., "Synthesis of Hydrophilic Coating Solution for Polymer Substrate Using Glycidoxypropyltrimethoxysilane", Journal of Sol-Gel Science and Technology, 2003, 27, pp. 53-59.
Shabanova et al., "Aggregation Stability of Colloidal Silica Sol-Polystyrene Latex Mixtures", Colloid Journal, vol. 63, No. 5, 2001, pp. 649-652.
Wu, "Nature-inspired superlyophobic surfaces", Dissertation, Eindhoven University of Technology Library, ISBN: 978-90-386-1126-6, 2007, 125 pages.
Xavier et al., "The role of initiation in the synthesis of silica/poly(methyl methacrylate) nanocomposite latex particles through emulsion polymerization", Colloid Polym Sci, 279, 2001, pp. 947-958.
Xu et al., "Synthesis of raspberry-like magnetic polystyrene microspheres", Materials Chemistry and Physics 103, 2007, pp. 494-499.
Zhang et al., "Self-Cleaning Particle Coating with Antireflection Properties", Chemistry of Materials, 2005, 17 (3), pp. 696-700, publ. on the web Jan. 14, 2005.
Co-pending U.S. Appl. No. 12/809,388, 371c date Feb. 17, 2011.
Co-pending U.S. Appl. No. 13/201,329, 371c date Aug. 12, 2011.

COATING COMPOSITION AND METHOD OF MAKING AND USING THE SAME

CROSS-REFERENCE TO RELATED APPLICATIONS

This application is a national stage filing under 35 U.S.C. 371 of PCT/US2010/027452, filed Mar. 16, 2010, which claims priority to U.S. Provisional Patent Application No. 61/164,986, filed Mar. 31, 2009, and the disclosure of which is incorporated by reference in its entirety herein.

TECHNICAL FIELD

The present disclosure broadly relates to compositions useful for coating a substrate.

BACKGROUND

There have been many efforts to develop compositions that can be applied to substrates to provide a beneficial protective layer with desirable properties such as one or more of easy cleaning, stain prevention, long lasting performance, soap scum deposit inhibition, and the like. Many compositions developed for such applications rely on materials (for example, volatile organic solvents) that can present environmental issues and/or involve complex application processes. Further, problems relating to inadequate shelf-life continue to plague product developers of such compositions.

Accordingly, for many products a tradeoff of attributes is typically struck between the desired performance attributes, environmental friendliness of the materials, satisfactory shelf-life, and ease of use by a relatively unskilled user.

There remains a need for shelf-stable environmentally friendly compositions that can be coated on a substrate (for example, a bathroom fixture or a window) to provide long lasting protection from soil and stain accumulation, especially if they can be readily handled by a relatively unskilled user.

SUMMARY

In one aspect, the present disclosure provides a composition comprising:

an aqueous continuous liquid phase; and core-shell particles dispersed in the aqueous continuous liquid phase, each core-shell particle comprising a polymer core surrounded by a shell consisting essentially of nonporous spherical silica particles disposed on the polymer core, wherein the nonporous spherical silica particles have a volume average particle diameter of 60 nanometers or less. In some embodiments, the polymer core comprises at least one polymer, wherein a weight ratio of a total amount of the nonporous spherical silica particles in the composition to a total amount of the at least one polymer in the composition is in a range of from 85:15 to 95:5. In other embodiments, the composition further comprises a surfactant. In some embodiments, the polymer core comprises a film-forming thermoplastic polymer which may comprise a polyurethane segment.

In some embodiments, the foregoing compositions have a pH value of less than 5. In some embodiments, the foregoing compositions are free of acicular silica particles. In another aspect, the present disclosure provides a method of making an article that comprises applying the composition to a surface of a substrate and at least partially drying the composition. In some embodiments, the surface comprises at least one of glass, metal, fiberglass, or ceramic. In some embodiments, the substrate is selected from the group consisting of shower surrounds, bathtubs, toilets, sinks, faucets, windows, and mirrors. In some embodiments, the substrate comprises a painted surface or a clearcoat surface.

In yet another aspect, the present disclosure provides articles made by the foregoing method.

In yet another aspect, the present disclosure provides a method comprising:

combining a first aqueous dispersion comprising nonporous spherical silica particles and a second aqueous dispersion comprising polymer particles to provide an alkaline dispersion having a pH value greater than 7; and gradually acidifying the alkaline dispersion such that a major portion of the polymer particles are converted to core-shell particles thereby providing a core-shell particle dispersion, each core-shell particle comprising a polymer core surrounded by a shell consisting essentially of nonporous spherical silica particles disposed on the polymer core, wherein the nonporous spherical silica particles have a volume average particle diameter of 60 nanometers or less. In some embodiments, the method further comprises contacting the composition with a protonated cation exchange resin.

In some embodiments, the core-shell particle dispersion contains less than 0.1 percent by weight of acicular silica particles based on a total weight of the core-shell particle dispersion. In some embodiments of the foregoing method, the core-shell particle dispersion is free of acicular silica particles.

Advantageously, compositions according to the present disclosure provide long lasting useful levels of protection from staining minerals and soap deposits when applied to common substrates having a hard surface; for example, those that may be found in or around a home or office. Moreover, the compositions may be formulated to contain little or no volatile organic solvents, are typically easy to apply, and may exhibit extended shelf stability.

In this application:

the term "polyurethane" includes any polymeric material that has at least one polyurethane segment;

the term "polyurethane segment" refers to at least two urethane and/or urea groups that are connected by an organic group.

DETAILED DESCRIPTION

Figure 1:
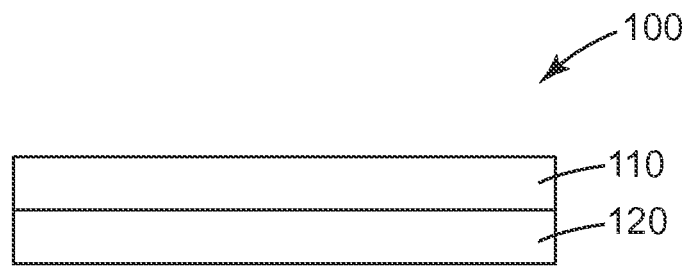
FIG. 1 is a schematic cross-sectional view of an exemplary article according to the present disclosure.

Compositions according to the present disclosure comprise an aqueous continuous liquid phase, and dispersed organic polymer particles having a silica particle shell thereon, wherein the silica particles have a mean particle size of 60 nm or less.

As used herein, the term "shell" refers to an assembly of nonporous spherical silica particles disposed on and covering (for example, densely covering) the surface of a polymer core. The nonporous spherical silica particles may optionally be covalently bonded one to another.

The aqueous continuous liquid phase comprises at least 5 percent by weight of water; for example, the aqueous continuous liquid phase may comprise at least 50, 60, 70, 80, or 90 percent by weight of water, or more. While the aqueous continuous liquid phase is preferably essentially free of (that is, contains less than 0.1 percent by weight of based on the total weight of the aqueous continuous liquid phase) organic solvents, especially volatile organic solvents, organic solvents may optionally be included in a minor amount if desired. If present, the organic solvents should preferably be water-miscible, or at least water-soluble in the amounts in which they are used, although this is not a requirement. Examples of organic solvents include acetone and lower molecular weight ethers and/or alcohols such as methanol, ethanol, isopropanol, n-propanol, glycerin, ethylene glycol, triethylene glycol, propylene glycol, ethylene glycol monomethyl or monoethyl ether, diethylene or dipropylene glycol methyl or ethyl ether, ethylene or propylene glycol dimethyl ether, and triethylene or tripropylene glycol monomethyl or monoethyl ether, n-butanol, isobutanol, s-butanol, t-butanol, and methyl acetate.

In order to minimize haze, the nonporous spherical silica particles have a volume average particle diameter (that is, a $D_{50}$) of 60 nanometers (nm) or less. Preferably, the nonporous spherical silica particles have a volume average particle diameter in a range of from 2 to 60 nm, more preferably in a range of from 1 to 20 nm, and still more preferably in a range of from 2 to 10 nm. The silica particles may have any particle size distribution consistent with the above 60 nm volume average particle diameter; for example, the particle size distribution may be monomodal or polymodal.

Nonporous spherical silica particles in aqueous media (sols) are well known in the art and are available commercially; for example, as silica sols in water or aqueous alcohol solutions under the trade designations LUDOX from E. I. du Pont de Nemours and Co., Wilmington, Del.), NYACOL from Nyacol Co. of Ashland, Mass., or NALCO from Nalco Chemical Co. of Naperville, Ill. One useful silica sol with a volume average particle size of 5 nm, a pH of 10.5, and a nominal solids content of 15 percent by weight, is available as NALCO 2326 from Nalco Chemical Co. Other useful commercially available silica sols include those available as NALCO 1115 and NALCO 1130 from Nalco Chemical Co., as REMASOL SP30 from Remet Corp. of Utica, N.Y., and as LUDOX SM from E. I. du Pont de Nemours and Co.

Non-aqueous spherical silica sols are spherical silica sol dispersions wherein the liquid phase is an organic solvent. Typically, the silica sol is chosen so that its liquid phase is compatible with the remaining components of the continuous liquid phase. Typically, sodium-stabilized nonporous spherical silica particles should first be acidified prior to dilution with an organic solvent such as ethanol, as dilution prior to acidification may yield poor or non-uniform coatings. Ammonium-stabilized silica nanoparticles may generally be diluted and acidified in any order.

The polymer core may comprise any polymer, typically one that can be prepared as a latex, more typically as an alkaline pH stable latex. Exemplary polymers include acrylic polymers, styrenic polymers, vinyl acetate-ethylene copolymers, polyvinyl acetate, styrene-butadiene rubbers, polyurethanes (including urethane-acrylic polymers), polyesters, and polyamides. Preferably, the polymer is a film-forming polymer. The polymer may be thermosetting or thermoplastic. Preferably, the polymer comprises a polyurethane segment as in the case of a polyurethane or a urethane-acrylic polymer (which typically has polyurethane and polyacrylic segments). Suitable polymer latexes and methods for making them are widely known in the art, and many are commercially available.

Examples of commercially available polymer latexes include those aqueous aliphatic polyurethane emulsions available as NEOREZ R-960, NEOREZ R-967, NEOREZ R-9036, and NEOREZ R-9699 from DSM NeoResins, Inc. of Wilmington, Mass.; aqueous anionic polyurethane dispersions available as ESSENTIAL CC4520, ESSENTIAL CC4560, ESSENTIAL R4100, and ESSENTIAL R4188 from Essential Industries, Inc. of Merton, Wis.; polyester polyurethane dispersions available as SANCURE 843, SANCURE 898, and SANCURE 12929 from Lubrizol, Inc. of Cleveland, Ohio; an aqueous aliphatic self-crosslinking polyurethane dispersion available as TURBOSET 2025 from Lubrizol, Inc.; and an aqueous anionic, co-solvent free, aliphatic self-crosslinking polyurethane dispersion, available as BAYHYDROL PR240 from Bayer Material Science, LLC of Pittsburgh, Pa.

Combinations of polymers may be included in the polymer core. For example, an individual polymer core may comprise two or more polymers. Further, the composition may contain two types of polymer cores, each comprising a different type of polymer, for example, as would be obtained by mixing an acrylic latex and a polyurethane latex. Typically, the particles in the polymer latexes are substantially spherical in shape. Typically, the polymer core comprises one or more water-insoluble polymers, although this is not a requirement.

Useful polymer particle sizes include those typical of latexes and other dispersions or emulsions. Typical polymer particle sizes are in a range of from about 0.01 micrometers to 100 micrometers, preferably in a range of from 0.01 to 0.2 micrometers, although this is not a requirement.

Core-shell particles may typically be prepared from an alkaline pH stable polymer particle dispersion and an alkaline spherical silica sol. Typically, such polymer particle dispersions become unstable upon acidification to pH values of 5 or less. Accordingly, it is unexpected that by adding the alkaline nonporous spherical silica sol to the aqueous polymer particle dispersion, with acidification, results in core-shell particles that are stable at low pH values.

To achieve shell formation the nonporous spherical silica particles should typically be smaller than the polymer core, although this is not a requirement. For example, the volume average particle diameter (D50) of the polymer particles may be on the order of at least 3 times greater than the volume average particle diameter (D50) of the spherical silica particles. More typically, the volume average particle diameter of the polymer particles should typically be on the order of at least 5 times, at least 10 times, or even at least 50 times greater than the volume average particle diameter of the spherical silica particles. For typical polymer particle sizes, a weight ratio of the nonporous spherical silica particles to the one or more polymer particles is in a range of from 30:70 to 97:3, preferably 80:20 to 95:5, and more preferably 85:15 to 95:5.

Without wishing to be bound by theory, it is believed that during gradual acidification of such a dispersion of polymer particles (for example, latex particles) and nonporous spherical silica particles in the aqueous liquid vehicle, the nonporous spherical silica particles deposit on the surface of the polymer latex particles, eventually in sufficient quantity to form a shell (typically at least a monolayer of the spherical silica particles) that serves to stabilize the dispersion and reduce or prevent agglomeration and precipitation of the polymer particles. It is further believed that upon addition of base to raise the pH that the nonporous spherical silica particles dissociate from the polymer latex particles and regenerate a mixture of the two types of particles.

Each core-shell particle comprises a polymer core surrounded by a shell that consists essentially of nonporous spherical silica particles disposed on the polymer core.

Accordingly, the shell is substantially free of other particulate matter, and especially acicular silica particles.

In addition, to facilitate coating, coating compositions according to the present disclosure preferably have a pH of less than 5, more preferably less than 4, and more still preferably less than 3. To facilitate handling, the coating compositions preferably have a pH of at least 1, more preferably at least 2. In some embodiments, for example, those involving an acid sensitive substrate, it may be preferable to adjust the pH to a value of from about 5 to about 7.5, although this may tend to disrupt the core-shell particle structure.

The compositions may be acidified to the desired pH level with an acid having a $pK_a$ of less than 5, preferably less than 2.5, and more preferably less than 1. Useful acids include both organic and inorganic acids such as, for example, oxalic acid, citric acid, benzoic acid, acetic acid, methoxyacetic acid, formic acid, propionic acid, benzenesulfonic acid, $H_2SO_3$, $H_3PO_4$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_3H$. Preferred acids include HCl, $H_2SO_4$, and $H_3PO_4$. Combinations of organic and inorganic acids may also be used. Using weaker acids having a $pK_a$ of greater than 5 may not result in a uniform coating having the desirable properties such as transmissivity, cleanability and/or durability.

Compositions according to the present disclosure may optionally include at least one surfactant. The term "surfactant" as used herein describes molecules with hydrophilic (polar) and hydrophobic (non-polar) segments on the same molecule, and which are capable of reducing the surface tension of the composition. Examples of useful surfactants include: anionic surfactants such as sodium dodecylbenzenesulfonate, dioctyl ester of sodium sulfosuccinic acid, polyethoxylated alkyl (C12) ether sulfate, ammonium salt, and salts of aliphatic hydrogen sulfates; cationic surfactants such as alkyldimethylbenzylammonium chlorides and di-tallowedimethylammonium chloride; nonionic surfactants such as block copolymers of polyethylene glycol and polypropylene glycol, polyoxyethylene (7) lauryl ether, polyoxyethylene (9) lauryl ether, and polyoxyethylene (18) lauryl ether; and amphoteric surfactants such as N-coco-aminopropionic acid. Silicone and fluorochemical surfactants such as those available under the trade designation FLUORAD from 3M Company of St. Paul, Minn., may also be used. If present, the amount of surfactant typically is in an amount of less than about 0.1 percent by weight of the composition, preferably between about 0.003 and 0.05 percent by weight of the composition.

The composition may also optionally contain an antimicrobial agent. Many antimicrobial agents are commercially available. Examples include those available as: Kathon CG or LX available from Rohm and Haas Co. of Philadelphia, Pa.; 1,3-dimethylol-5,5-dimethylhydantoin; 2-phenoxyethanol; methyl-p-hydroxybenzoate; propyl-p-hydroxybenzoate; alkyldimethylbenzylammonium chloride; and benzisothiazolinone.

Compositions according to the present disclosure may be made by any suitable mixing technique. One useful technique includes combining an alkaline polymer latex with an alkaline spherical silica sol of appropriate particle size, and then adjusting the pH to the final desired level.

In some embodiments, the compositions are free of various impurities including nonspherical silica particles, porous silica particles, and added crosslinkers (for example, polyaziridines or orthosilicates). Accordingly, compositions according to the present disclosure may contain less than 0.1 weight percent or less than 0.01 weight percent of acicular silica particles, and, if desired, they may be free of acicular silica particles.

Compositions according to the present disclosure are useful, for example, for coating a substrate. Referring now to FIG. 1, an article 100 comprises a substrate 120 having a layer 110 disposed thereon. Layer 110 is formed by applying a composition according to the present disclosure to a surface of a substrate and at least partially removing the aqueous continuous liquid phase from the composition.

Suitable substrates may include, for example, glass (for example, windows (including architectural and motor vehicle windows) and optical elements such as, for example, lenses and mirrors), ceramic (for example, ceramic tile), cement, stone, painted and/or clearcoat surfaces (for example, automobile or truck body or closure panels, boat surfaces, motorcycle parts, truck tractors, snowmobiles, jet skis, off-road vehicles, and tractor trailers), appliances, plastic protective films which are backed with pressure-sensitive adhesives, metal (for example, architectural columns, plumbing fixtures), fiberglass, thermosetting polymers, sheet molding compound, thermoplastics (for example, polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof. Additional exemplary substrates include bathtubs, toilets, sinks, faucets, mirrors, windows.

Compositions according to the present disclosure are particularly useful in the coating of automotive panels having painted or clearcoat surfaces, examples of which include: polyacrylic-polyol-polyisocyanate compositions (for example, as described in U.S. Pat. No. 5,286,782 (Lamb, et al.); hydroxyl functional acrylic-polyol-polyisocyanate compositions (for example, as described in U.S. Pat. No. 5,354,797 (Anderson, et al.); polyisocyanate-carbonate melamine compositions (for example, as described in U.S. Pat. No. 6,544,593 (Nagata et al.); high solids polysiloxane compositions (for example, as described in U.S. Pat. No. 6,428,898 (Barsotti et al.)). Clearcoats are transparent protective coatings (typically crosslinked coatings comprising an organic polymer) applied over a paint layer to enhance protection and/or gloss. Examples of clearcoats include that available as CERAMICLEAR from PPG Industries, Pittsburgh, Pa. and RK8014, a urethane acrylate clearcoat available from E. I. du Pont de Nemours and Co.

In some embodiments, compositions according to the present disclosure, when coated on a substrate and at least partially dried, provide improved cleanability by way of a reduced tendency to accumulate dirt and other contaminants. By "cleanable" it is meant that compositions according to the present disclosure, when dried and cured, provide a coating which is easier to clean by contacting with flowing water or a water spray to readily displace overlying contamination, thereby removing a substantial portion of the contamination from the coating. The water sheeting effect allows road spray, snow, slush dirt, soap scum, and staining minerals in rainwater and rinse water to substantially sheet out and run off the substrate surface, which significantly reduces the amount and the localized concentration of contaminants that are deposited after the water dries.

In some embodiments, the composition provides an abrasion resistant layer that helps protect the substrate from damage from causes such as scratches, abrasion, and solvents.

The compositions are preferably coated on the article using conventional coating techniques, such as brush, bar, roll, wipe, curtain, rotogravure, spray, or dip coating techniques. For ease and simplicity, a preferred method is to wipe the coating formulation on using a suitable woven or nonwoven cloth, sponge, or foam. Such application materials are preferably acid-resistant and may be hydrophilic or hydrophobic in nature, preferably hydrophilic. Another method to control final thickness and resultant appearance is to apply the coating using any suitable method and, after allowing a portion of the solvent to evaporate, to rinse off excess composition with a stream of water, while the substrate is still fully or substantially wetted with the composition.

Compositions according to the present disclosure are preferably applied to a substrate in a uniform average wet thickness varying from 0.5 to 50 micrometers, and more preferably 1 to 10 micrometer, in order to avoid visible interference color variations in the coating, although other thicknesses may also be used.

The optimal average dry coating thickness is dependent upon the particular composition that is coated, but in general the average thickness of the composition coating thickness is between 0.05 to 5 micrometers, preferably 0.05 to 1 micrometer; for example, as estimated from atomic force microscopy and/or surface profilometry. Above this range, the dry coating thickness variations typically cause optical interference effects, leading to visible iridescence (rainbow effect) of the dried coating which is particularly apparent on darker substrates. Below this range the dry coating thickness may be inadequate to confer sufficient durability for most coatings exposed to environmental wear.

After coating the surface of the substrate, the resultant article is typically dried at ambient or warm temperatures without the need for high temperature heat, radiation or other curing method. Although higher temperature may increase the speed of the drying process, such temperatures are usually not practical or convenient and care must be exercised to avoid damage to the substrate.

Preferably, compositions according to the present disclosure are stable when stored in the liquid form, for example, they do not gel, opacify, form precipitated or agglomerated particulates, or otherwise deteriorate significantly.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. All contact angle reported in the Examples are static contact angles reported in degrees.

The following abbreviations are used in the Examples below:

NPS1: A 16.2 percent solids (nominally 15 percent solids) aqueous colloidal spherical silica dispersion, available as NALCO 2326 from NALCO Chemical Company of Naperville, Ill.;

NPS2: A 16.5 percent solids (nominally 15 percent solids) aqueous colloidal spherical silica dispersion, available as NALCO 1115 from NALCO Chemical Company;

NPS3: A 50 percent solids aqueous colloidal spherical silica dispersion, available as NALCO 1050 from NALCO Chemical Company;

NPS4: A 20 percent solids aqueous colloidal non-spherical silica dispersion, available as ST-UP from Nissan Chemical America Corporation of Houston, Tex.;

NPS5: A 20 percent solids aqueous colloidal non-spherical silica dispersion, available as ST-PS-S from Nissan Chemical America Corporation;

NPS6: A 20 percent solids aqueous colloidal non-spherical silica dispersion, available as ST-PS-M from Nissan Chemical America Corporation;

PU1: A 33 percent solids aqueous aliphatic polyurethane emulsion, available as NEOREZ R-960 from DSM NeoResins, Inc. of Wilmington, Mass.;

PU2: A 40 percent solids aqueous aliphatic polyurethane emulsion, available as NEOREZ R-967 from DSM NeoResins, Inc.;

PU3: A 40 percent solids aqueous aliphatic polyurethane emulsion, available as NEOREZ R-9036 from DSM NeoResins, Inc.;

PU4: A 40 percent solids aqueous aliphatic polyurethane emulsion, available as NEOREZ R-9699 from DSM NeoResins, Inc.;

PU5: A 35 percent solids aqueous anionic polyurethane dispersion, available as ESSENTIAL CC4520 from Essential Industries, Inc. of Merton, Wis.;

PU6: A 32 percent solids aqueous anionic polyurethane dispersion, available as ESSENTIAL CC4560 from Essential Industries, Inc.;

PU7: A 33 percent solids aqueous anionic aliphatic polyester polyurethane dispersion, available as ESSENTIAL R4100 from Essential Industries, Inc.;

PU8: A 38 percent solids aqueous anionic aliphatic polyester polyurethane dispersion, available as ESSENTIAL R4188 from Essential Industries, Inc.;

PU9: A 32 percent solids aqueous aliphatic polyester polyurethane dispersion, available as SANCURE 843 from Lubrizol, Inc. of Cleveland, Ohio;

PU10: A 32 percent solids aqueous aliphatic polyester polyurethane dispersion, available as SANCURE 898 from Lubrizol, Inc.;

PU11 A 40 percent solids aqueous aliphatic polyester polyurethane dispersion, available as SANCURE 12929 from Lubrizol, Inc.;

PU12: A 36 percent solids aqueous aliphatic self-crosslinking polyurethane dispersion, available as TURBOSET 2025 from Lubrizol, Inc.;

PU13: A 40 percent solids aqueous anionic, co-solvent free, aliphatic self-crosslinking polyurethane dispersion, available as BAYHYDROL PR240 from Bayer Material Science, LLC of Pittsburgh, Pa.;

PU14: A 35 percent solids aqueous aliphatic polyurethane emulsion, available as NEOREZ R-2180 from DSM NeoResins, Inc.;

PA1: A 42 percent solids aqueous aliphatic acrylic acid emulsion, available as NEOCRYL A-633 from DSM Neo-Resins, Inc.;

PA2: A 44 percent solids aqueous aliphatic acrylic acid emulsion, available as NEOCRYL A-655 from DSM Neo-Resins, Inc.;

PA3: A 45 percent solids aqueous aliphatic acrylic acid emulsion, available as NEOCRYL XK-90 from DSM Neo-Resins, Inc.;

PS1: A 10.1 percent solids aqueous polystyrene emulsion;

HCl: Hydrochloric acid, 36.5-38.0 percent unless otherwise noted;

OA: Oxalic acid

TP1: An aluminum test panel having the following coatings: CORMAX 6EP e-coat, 708DM730 primer, 648DN027 black base coat and Du Pont RK8014 clear coat, obtained from ACT Laboratories of Hillsdale, Mich.;

TP2: An aluminum test panel having the following coatings: CORMAX 6EP e-coat, 708DM730 primer, 648DN027 white base coat and Du Pont RK8014 clear coat, obtained from ACT Laboratories;

TP3: An aluminum test panel having the following coatings: PC8000 e-coat, 615S primer, Du Pont IMRON 6000 LOOO6H white base coat and Du Pont 3440S clear coat, obtained from ACT Laboratories;

TP4: A steel test panel having the following coatings: an unspecified automotive e-coat, 765224EH primer, 270AB921 black base coat, and Du Pont RK8148 clear coat, obtained from ACT Laboratories;

TP5: A poly(methyl methacrylate) test panel;

TP6: A polystyrene-fiberglass test panel.

TP7: Float glass from Cardinal Glass, Eden Prairie. Minn.

Contact Angle Measurement

Static water contact angle measurements (SWCA) were made using purified and filtered water, available as OMNI-SOLV from EM Science of Gibbstown, N.J. The contact angle analyzer used a custom-built manual instrument equipped with a goniometer-microscope obtained from Gaertner Scientific Corporation of Chicago, Ill., mounted on a horizontal positioning device, model number UNISLIDE SERIES A2500 made by Velmex, Inc. of Holcomb, N.Y. Water droplets approximately 0.5 microliters (μl) in volume were dispensed from a 1 cubic centimeter ($cm^3$) syringe having a flat-tipped needle, obtained from Henke Sass Wolf GmbH, Tuttlinger, Germany, using a micrometer thimble, barrel, and spindle, Part No. 263, from L. S. Starrett of Athol, Mass. The tip of the syringe needle was flattened using a fine grit sandpaper. The syringe was mounted on a double-armed holder which that was lowered through a screw crank to deposit the water drop on the test specimen as it rested on an adjustable platform. The drop was backlit through a translucent paper screen with a small lamp. The leveling of the contact angle instrument was monitored with a circular bull's-eye level, adjustable through four leveling screws. Contact angle was measured on sessile water drops approximately 30 seconds after deposition, and the value reported is the average of measurements made on at least three separate drops on each test panel.

Soap Scum Mixture

Crushed IVORY soap (The Procter and Gamble Co. of Cincinnati, Ohio, 1.6 grams) was added to hot tap water (192 grams) in a first vessel and then the mixture was sonicated for 30 minutes at 60° C. Subsequently, artificial sebum (1.2 grams) was added and the mixture was sonicated for an additional 10 minutes. A second vessel was charged with hot tap water (600 grams), CLAIROL TOTALLY TWISTED HERBAL ESSENCE shampoo (The Procter and Gamble Co., 1.6 grams), CLAIROL COLOR ME HAPPY HERBAL ESSENCE conditioner (The Procter and Gamble Co., 4.0 grams), and then stirred for 15 seconds. Oleic acid (1.6 grams) was added to the shampoo solution and the solution was then stirred for an additional 15 seconds. The contents of both solutions were ten combined and mixed for an additional 2 hours.

Example 1

NPS1 (1.992 grams (g)) was manually mixed with 4.404 g of deionized water. A master batch of 4.5 percent solids polyurethane dispersion was prepared by manually mixing until homogeneous, 5.125 g of PU1 with 32.113 g of deionized water at 22° C. A dispersion having a silica:polyurethane ratio of 9:1 was made by manually mixing at 22° C. until homogeneous, the diluted NPS with 0.787 g of the 4.5 percent solids PU1. To this was added 2 drops HCl, and the mixture was agitated. The dispersion was then diluted to a total solids content of 0.5 percent by weight with deionized water, and the pH was measured using pH paper.

Examples 2-11

Using a process analogous to that described in Example 1, a master batch of 5.32 percent solids NPS1 was prepared by manually mixing until homogeneous 30.013 g of NPS1 with 66.014 g of deionized water at 22° C. Aliquots (approximately 6.4 g each) of the 5.32 percent solids NPS1 master batch were combined with suitable amounts of 4.5 percent solids polyurethane dispersions PU2 and PU5-PU13. As indicated in Table 1, drops of HCl were added to these mixtures after which each NPS:PU dispersion was then diluted to a total solids content of between 0.50-1.00 percent and silica:polyurethane ratios of between 9:1 to 7:3. Compositions of Examples 1-11 are reported in Table 1 (below).

TABLE 1

| EXAMPLE | POLY-URETHANE DISPERSION | SILICA/URETHANE RATIO | DROPS HCL | TOTAL SOLIDS, percent | pH |
|---|---|---|---|---|---|
| 1 | PU1 | 9:1 | 2 | 0.50 | 2.5 |
| 2 | PU2 | 8:2 | 1 | 0.75 | 4.0 |
| 3 | PU5 | 9:1 | 0 | 0.50 | 8.5 |
| 4 | PU6 | 7:3 | 0 | 0.50 | 8.5 |
| 5 | PU7 | 7:3 | 2 | 0.50 | 3.0 |
| 6 | PU8 | 8:2 | 1 | 0.75 | 4.0 |
| 7 | PU9 | 8:2 | 1 | 0.75 | 4.0 |
| 8 | PU10 | 7:3 | 0 | 1.00 | 9.5 |
| 9 | PU11 | 9:1 | 2 | 1.00 | 2.0 |
| 10 | PU12 | 9:1 | 0 | 1.00 | 9.0 |
| 11 | PU13 | 7:3 | 2 | 1.00 | 2.5 |

One-inch by two-inch (2.54 by 5.08 centimeters (cm)) aluminum coupons of test panels TP1, TP2 and TP3 were sprayed with ethanol and wiped dry prior to applying the test dispersions. In the coating process, a single drop of each test dispersion was placed on a test panel and then wiped down the long axis of the panel using several strokes with a large rectangular foam pad swab, type CRITICAL SWAB, Catalog No. 89022-984 from VWR Scientific of West Chester, Pa. The coupons were laid flat and dried at 22° C. for 24 hours. Static water contact angles (SWCA) were then measured on each of three separate drops evenly spaced along the long axis of each coupon. The coupons were then subjected to two wet sponge abrasion cycles using a BYK-Gardner Abrasion Tester, obtained from BYK-Gardner Company of Columbia, Md. The SWCA was again measured, after which the coupons were subjected to another 8 abrasion cycles and the SWCA was again measured. Results, presented as an average (AVG.) from all test coupons and with standard deviation (SD), are reported in Table 2 (below).

TABLE 2

| | SWCA (Degrees) | | |
|---|---|---|---|
| EXAMPLE | INITIAL (AVG./SD) | AFTER 2 ABRASION CYCLES (AVG./SD) | AFTER 10 ABRASION CYCLES (AVG./SD) |
| 1 | 6.8/8.6 | 15.9/7.5 | 23.5/8.5 |
| 2 | 64.5/11.8 | 57.5/15.9 | 59.3/4.6 |
| 3 | 63.5/8.2 | 62.6/7.1 | 54.8/9.5 |
| 4 | 71.6/2.2 | 64.3/7.0 | 54.9/11.9 |

TABLE 2-continued

| | SWCA (Degrees) | | |
|---|---|---|---|
| EXAMPLE | INITIAL (AVG./SD) | AFTER 2 ABRASION CYCLES (AVG./SD) | AFTER 10 ABRASION CYCLES (AVG./SD) |
| 5 | 58.5/10.6 | 53.5/13.4 | 51.9/6.8 |
| 6 | 30.4/24.1 | 41.2/16.7 | 40.9/13.8 |
| 7 | 30.3/22.5 | 42.9/22.1 | 42.1/13.5 |
| 8 | 69.7/2.6 | 60.5/10.9 | 57.5/5.8 |
| 9 | 3.4/4.9 | 14.6/5.4 | 21.1/6.1 |
| 10 | 63.6/6.3 | 66.3/3.2 | 63.5/7.3 |
| 11 | 48.0/4.3 | 50.9/7.8 | 56.3/9.7 |

Examples 12-15 and Comparative Examples A-B

NPS1 (2.069 g) was mixed with 4.226 g deionized water in a plastic bottle. To this was added 0.655 g of a 5.0 percent solids aqueous solution of PU1, and the dispersion manually mixed at 22° C. until homogeneous. One drop of HCl was added and the dispersion again manually mixed until homogeneous. A pH of 3 was recorded using pH paper. From this dispersion, 0.5 g was diluted with 2.5081 g deionized water to provide a test solution having a total solids concentration of 0.885 percent. This test solution was then applied to one half of test panels TP3 and TP4, measuring 3 inches by 4 inches (7.62 by 10.16 cm), using a lint free wiper, type KIM-WIPE EX-L, from Kimberly-Clark Corp. of Roswell, Ga. The panels were dried at 22° C., then attached to the lower rear side of a vehicle. After driving the vehicle for 30 days, gloss measurements were made on the test panels using a gloss meter, model MICRO TRIGLOSS, from BYK-Gardner Company of Columbia, Md. Results are reported in Table 3 (below).

TABLE 3

| EXAMPLE | TEST PANEL | TREATED | NUMBER OF DAYS | 60-DEGREE GLOSS | 85-DEGREE GLOSS |
|---|---|---|---|---|---|
| Comparative Example A | TP3 | No | 0 | 91.3 | 98.4 |
| 12 | TP3 | No | 30 | 72.5 | 59.4 |
| 13 | TP3 | Yes | 30 | 78.8 | 76.4 |
| Comparative Example B | TP4 | No | 0 | 93.0 | 99.0 |
| 14 | TP4 | No | 30 | 74.3 | 61.3 |
| 15 | TP4 | Yes | 30 | 80.0 | 69.7 |

Example 16

NPS1 (9.998 g) was mixed with 21.992 g of deionized water in a plastic bottle. To this was added 3.939 grams of a 4.5 percent solids aqueous solution of PU1, and the dispersion manually mixed at 22° C. until homogeneous. Ten drops of HCl were added, and the dispersion again manually mixed until homogeneous. A pH of between 1 and 1.5 was recorded using pH paper. Then 9.997 grams of this dispersion was diluted with 40.002 grams deionized water to provide a test solution having a total solids concentration of 0.885 percent solids. Using pH paper, a pH of 1.5 was recorded. The dispersion was applied to the driver's side of the hood of a vehicle using a polyester/rayon cheesecloth, obtained from Daego Company, Ltd. of South Korea. To the passenger's side of the hood was applied a comparative material, 3M PERFORMANCE FINISH, from 3M Company of St. Paul, Minn., using a 3M general purpose microfiber cloth. After 33 days of driving the hood was rinsed with water using a spray hose and allowed to dry at 22° C., without wiping. Before and after gloss measurements are reported in Table 4 (below).

TABLE 4

| HOOD SECTION | TREATED | NUMBER OF DAYS | 60-DEGREE GLOSS, (AVG./SD) | 85-DEGREE GLOSS, (AVG./SD) |
|---|---|---|---|---|
| Passenger Side | No | 0 | 88.4/1.1 | 98.6/2.0 |
| Passenger Side | Comparative material | 0 | 87.6/1.2 | 98.8/1.5 |
| Passenger Side | Comparative material | 33 | 73.5/3.2 | 73.8/3.0 |
| Driver Side | No | 0 | 89.7/1.3 | 99.2/1.2 |
| Driver Side | Example 16 | 0 | 84.3/1.1 | 99.4/1.2 |
| Driver Side | Example 16 | 33 | 80.2/1.9 | 91.9/1.5 |

Examples 17-26

A master batch of 5.33 percent solids of NPS1 dispersion was prepared by manually mixing until homogeneous 31.049 g of NPS1 with 63.389 g of deionized water at 22° C. Dispersions of polyurethanes PU2 and PU5-PU11 containing 5 percent solids were made by diluting the as-received dispersions with the appropriate amount of deionized water. Approximately 0.65 g of the diluted polyurethanes were then mixed with approximately 6.3 g of the 5.33 percent solids NPS1 master batch to provide a mixture having a total solids content of 5.25 percent solids. One drop of HCl was added to each of these nanoparticle silica-polyurethane dispersions and the pH recorded using pH paper. Contact angles of these examples were measured on one-inch by two-inch (2.54 cm by 5.08 cm) TP2 test panels which had been coated by wiping down two applied drops of each coating using KIM-WIPE EX-L wipes. The dispersions were diluted to 2.5 percent solids and additional test panels were coated. Contact angles were again measured. Results are reported in Table 5 (below).

TABLE 5

| | | 5.3 PERCENT TOTAL SOLIDS | | 2.5 PERCENT TOTAL SOLIDS | |
|---|---|---|---|---|---|
| EXAMPLE | PU | pH | STATIC WATER CONTACT ANGLE | pH | STATIC WATER CONTACT ANGLE |
| 17 | PU2 | 1.5-2 | 39.3 | 2 | 47.3 |
| 18 | PU5 | 2.5 | 17.3 | 4 | 16.8 |
| 19 | PU6 | 2 | 7.9 | 2.5 | 12.5 |
| 20 | PU7 | 2 | 5.7 | 2 | 10.9 |
| 21 | PU8 | 2 | 21.5 | 5.5 | 26.9 |
| 22 | PU9 | 2 | 6.9 | 2.5 | 15.7 |
| 23 | PU10 | 2 | 4.1 | 2 | 8.6 |
| 24 | PU11 | 1.5-2 | 19.3 | 2 | 26.2 |
| 25 | PU12 | 2 | 3.9 | 2 | 0 |
| 26 | PU13 | 2 | 19.1 | 2.5 | 20.8 |

Example 27

9.042 g of the 5.33 percent solids NPS1 dispersion was mixed with 1.010 grams of percent solids PU8. One drop of this mixture was applied to a one-inch by two-inch (2.54 by 5.08 cm) aluminum coupon of test panel TP3 and spread out using a KIM-WIPE EX-L wiper. The drop beaded up on and did not wet the test coupon. The mixture was then acidified to a pH of 2.5, as measured by pH paper, using a 6.65 percent solids oxalic acid solution. A drop of the acidified mixture readily spread on a second TP3 coupon using a KIM-WIPE EX-L wipe. The average static water contact angle of the coated coupon was determined to be 23.0 degrees.

Examples 101-109 and Comparative Example C

Five percent solids aqueous dispersion of PU1, NPS1, NPS2 and NPS3 were prepared and subsequently mixed to provide silica:polyurethane ratios of 9:1, 8:2. The pH was then adjusted dropwise with HCl (1.0 N). Particle sizes (Z-average) and the polydispersity index (PDI) were obtained with a dynamic light scattering (DLS) instrument model MALVERN ZETASIZER NANO ZS Series from Malvern Instruments Ltd. of Worcestershire, UK. Measurements were made with a quartz (1 cm) cuvette assuming refractive index of material (n=1.47). All samples were measured in water (n=1.33) at 25° C. Results are reported in Table 6 (below).

TABLE 6

| EXAMPLE | NPS | SILICA:POLY-URETHANE RATIO | pH | Z-AVERAGE DIAMETER, nm | PDI |
|---|---|---|---|---|---|
| Comparative Example C | None | PU1 | 8 | 41 | 0.26 |
| 101 | NPS2 | 9:1 | 4.0 | 113 | 0.199 |
| 102 | NPS2 | 8:2 | 3 | 638.1 | 0.501 |
| 103 | NPS2 | 8:2 | 2.5 | 830 | 0.539 (HCl) |
| 104 | NPS1 | 9:1 | 3 | 201.0 | 0.265 |
| 105 | NPS1 | 9:1 | 2.5 | 220 | 0.383 (HCl) |
| 106 | NPS1 | 8:2 | 3 | 1023 | 0.968 (HCl) |
| 107 | NPS3 | 9:1 | 4.0 | 102 | 0.293 (IEX) |
| 108 | NPS3 | 1:9 | 5 | 172.2 | 0.262 (HCl) |
| 109 | NPS3 | 8:2 | 5 | 1213 | 0.863 |

Examples 110-113 and Comparative Example D

Figure 2:
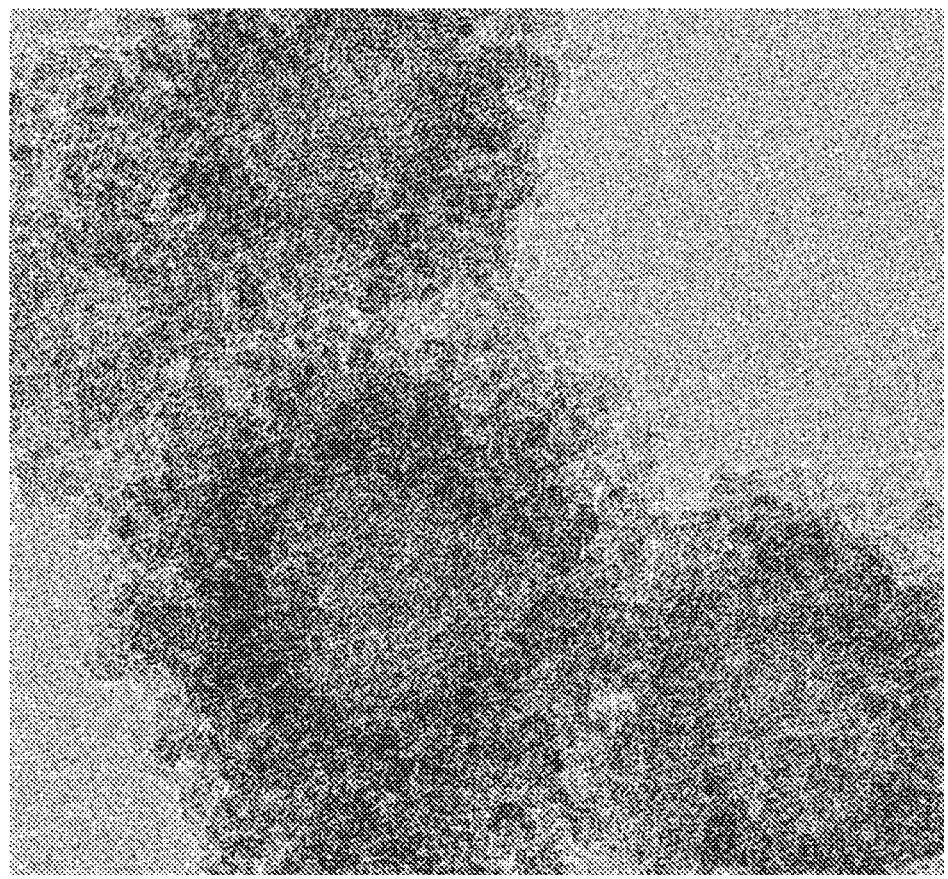
FIG. 2 is a photomicrograph of the composition of Example 112.

Four dispersions of NPS2 and PU1 were made at a silica:polyurethane ratio of 9:1 generally according to the method described in Example 101, and were adjusted with HCl (1.0 N) to respective pH values of 1.5, 2.5, 3.0 and 4.0. Particle size and PDI values are reported in Table 7. A transmission electron micrograph (TEM) of the 9:1 NPS2:PU1 sample (Example 112), shown in FIG. 2, confirms the core-shell nature of the particle.

TABLE 7

| EXAMPLE | pH | Z-AVERAGE DIAMETER, nm | PDI |
|---|---|---|---|
| Comparative Example D | 8.0 | 41 | 0.264 |
| 110 | 4.0 | 113 | 0.199 |
| 111 | 3 | 144.6 | 0.233 |
| 112 | 2.5 | 121.9 | 0.215 |
| 113 | 1.5 | 123 | 0.220 |

Examples 114-117

A cationic ion exchange column was made by packing a 5 milliliter (ml) disposable syringe with glass wool, followed by an ion exchange resin available as AMBERLITE IR-120 PLUS(H) from Dow Chemical Co. The packed resin bed was then rinsed twice with 2 milliliters (ml) of deionized water. A series of silica (NPS2):polyurethane (PU1) dispersions, having ratios of 9:1, 8:2, 7:3 and 6:4 were made generally according to the method described in Example 101. A portion (10 g) of each dispersion was repeatedly passed through the cationic ion exchange column until a pH of 3.0 was reached. The resulting core-shell particle sizes and PDI values are reported in Table 8 (below).

TABLE 8

| EXAMPLE | SILICA:POLYURETHANE RATIO | pH | Z-AVERAGE DIAMETER, nm | PDI |
|---|---|---|---|---|
| 114 | 9:1 | 3.0 | 62.4 | 0.256 |
| 115 | 8:2 | 3.0 | 56.0 | 0.283 |
| 116 | 7:3 | 3.0 | 102.2 | 0.515 |
| 117 | 6:4 | 3.0 | 166.2 | 0.890 |

Examples 118-121 and Comparative Examples E-F

Silica:polyurethane (9:1) dispersions of NPS1 or NSP2 with PU1, at a concentration of 5 percent solids, were made according to the method described in Example 102 The pH was adjusted to 2.0 with HCl (1.0 N). The dispersions were applied to test panels TP5 and TP6 using a KIM-WIPE EX-L wiper and allowed to dry at 22° C. for 2 hours. The test panels were then dipped into the soap scum mixture, removed and dried for 15 minutes at 22° C. The dipping process was repeated three more times on each panel, after which the panels were rinsed in 600 ml deionized water.

The samples were then subjected to three rinsing cycles with a low-pressured water stream at a speed of 600 ml/minute. The samples were dried with a stream of compressed air after each cycle. The sample surfaces were then visually examined to determine if any soap scum residue remained after rinsing. The Cleaning Performance of each coating was visually rated on a scale of 1-5 as defined below.

5: excellent (soap scum completely removed)

4: very good (soap scum remained less than 2 percent in surface area)

3: good (soap scum remained less than 5 percent in surface area)

2: fair (soap scum remained less than 10 percent in surface area)

1: poor (soap scum remained in more than 15-20 percent in surface area)

Results are reported in Table 9 (below).

TABLE 9

| EXAMPLE | NPS | TEST PANEL | CLEANING PERFORMANCE RATING ($1^{ST}$ CYCLE) | CLEANING PERFORMANCE RATING ($2^{ST}$ CYCLE) | CLEANING PERFORMANCE RATING ($3^{rd}$ CYCLE) |
|---|---|---|---|---|---|
| 118 | NPS2 | TP5 | 4.5 | 4.5 | 4.5 |
| 119 | NPS1 | TP5 | 4.5 | 4.5 | 4.5 |
| 120 | NPS2 | TP6 | 4.5 | 4.5 | 4.5 |
| 121 | NPS1 | TP6 | 4.5 | 4.5 | 4.5 |

TABLE 9-continued

| EXAMPLE | NPS | TEST PANEL | CLEANING PERFORMANCE RATING ($1^{ST}$ CYCLE) | CLEANING PERFORMANCE RATING ($2^{ST}$ CYCLE) | CLEANING PERFORMANCE RATING ($3^{rd}$ CYCLE) |
|---|---|---|---|---|---|
| Comparative Example E | deionized water only | TP5 | 1 | 1 | 1 |
| Comparative Example F | deionized water only | TP6 | 1 | 1 | 1 |

Examples 122-126 and Comparative Example G

Examples 122-126 (10 g samples) were prepared by mixing PU1 with NPS2 individually in the ratios described in Table 10. The mixtures were acidified to the pH values indicated in Tables 10 by ion exchange (IEX) or by acid addition.

For the IEX procedure (Acidification Method A), a disposable syringe (5 ml) was packed with glass wool followed by 1-2 cm$^3$ of AMBERLITE IR-120 PLUS(H) ion exchange resin. The packed bead bed was rinsed with deionized water (2×2 ml portions) before passing 10 gram samples of the coating dispersion through the resin beads until the desired pH value was obtained, sometimes requiring multiple passes. The pH was monitored after each pass with pH paper.

Alternatively, the coating dispersion was acidified with $H_3PO_4$ (1.0 M) to the noted pH while mixing on a stirring plate with a magnetic stirrer (Acidification Method B).

Test samples for the soap scum test were prepared by coating float glass panels (3 inches×6 inches) (7.6 cm×15.2 cm) with the example solutions using a KIM-WIPE EX-L paper wiper. Prior to coating, the glass panels were cleaned with a cleaning solution (ALCONOX POWDERED PRECISION CLEANER from Alconox, Inc. of White Plains, N.Y.) dissolved in water according to the manufacturer's directions. The samples were allowed to air-dry for a period greater than 2 hr before performing the test. Three sprays of prepared soap scum mixture were applied using a spray bottle to each sample. The samples were allowed to air-dry for 15 min before an additional three sprays were applied. This process was repeated for a total of three applications before the samples were rinsed with deionized water (600 ml/min) and dried to complete one cycle. Cleaning performance ratings were determined as in Example 121, and are reported in Table 10, wherein:

Method A=the mixture was subjected to IEX resin acidification and kept at 25° C. for 5 days.

Method B=the mixture was acidified with $H_3PO_4$ (1.0 M) and used immediately.

Method C=the mixture was subjected to IEX resin acidification and kept at 48° C. for 12 days.

TABLE 10

| EXAMPLE | TEST PANEL | COMPOSITION | ACIDIFICATION METHOD | pH | CLEANING PERFORMANCE RATING |
|---|---|---|---|---|---|
| 122 | TP7 | 5% (9:1)-NPS2/PU1 | A | 4 | 3 |
| 123 | TP7 | 5% (9:1)-NPS2/PU1 | A | 4.5 | 3 |
| 124 | TP7 | 5% (9:1)-NPS2/PU1 | B | 4 | 3 |
| 125 | TP7 | 5% (9:1)-NPS2/PU1 | C | 4.5 | 3 |
| 126 | TP7 | 5% (9:1)-NPS2/PU1 | A | 4 | 2.5 |
| Comparative Example G | | deionized water | — | — | 1 |

Example 127-130 and Comparative Example H-J

To evaluate the effect of aging on the cleaning performance sample solutions 130-133 (10 g) in Table 11 were prepared and tested in the same manner as described in Table 10 (above), but aged for a period of times denoted in Table 11 (below), wherein:

Method A=the mixture was subjected to IEX resin acidification and kept at 25° C. for 5 days.

Method B=the mixture was acidified with $H_3PO_4$ (1.0 M) and used immediately.

Method C=the mixture was subjected to IEX resin acidification and kept at 48° C. for 12 days.

TABLE 11

| EXAMPLE | COMPOSITION | ACIDIFICATION METHOD | pH | CLEANING PERFORMANCE RATING |
|---|---|---|---|---|
| 123 | 5% (9:1)-NPS2/PU1 | A | 4 | 3.5 |
| 124 | 5% (9:1)-NPS2/PU1 | C | 5 | 3.5 |
| 125 | 5% (9:1)-NPS2/PU1 | B | 4 | 3.5 |
| 126 | 5% (9:1)-NPS1/PU1 | C | 4.5 | 3.0 |
| Comparative Example H | deionized water | — | — | 1 |

Examples 134-159 and Comparative Examples H-J

Compositions were prepared and tested generally according to the method of Example 118 as indicated in Tables 12-16 below. In Tables 12-15, static water contact angle measurements were made on the dried coated samples using as-received deionized water filtered through a filtration system obtained from Millipore Corporation of Billerica, Mass. on a video contact angle analyzer available as product number VCA-2500XE from AST Products of Billerica, Mass. Reported values are the averages of measurements on at least three drops measured on the right and the left sides of the drops. Drop volumes were one microliter for static measurements. In Tables 12-15 (below), the pH was adjusted using 0.1 N HCl.

TABLE 12

| EXAMPLE | COMPOSITION | pH | CONTACT ANGLE (INITIAL) | CONTACT ANGLE ($1^{ST}$ CYCLE) | CONTACT ANGLE ($2^{ND}$ CYCLE) | CONTACT ANGLE ($3^{RD}$ CYCLE) | CLEANING PERFORMANCE RATING AFTER $3^{RD}$ CYCLE |
|---|---|---|---|---|---|---|---|
| 127 | 5%-(9:1)-NPS2/PU1 | 2 | 9.2 | 23.0 | 32.6 | 33.8 | 3.5 |
| 128 | 5%-(9:1)-NPS2/PU3 | 5 | 24.2 | 33.4 | 40.0 | 39.6 | 3.5 |
| 129 | 5%-(9:1)-NPS2/PU14 | 5 | 14.6 | 29.4 | 36.8 | 35.9 | 3.5 |
| 130 | 5%-(9:1)-NPS2/PU2 | 5 | 12.7 | 24.8 | 34.2 | 37.3 | 4.0 |
| 131 | 5%-(9:1)-NPS2/PU4 | 5 | 19.1 | 23.7 | 38.0 | 38.1 | 4 |
| 132 | 5%-(9:1)-NPS5/PU1 | 5 | 7.2 | 17.3 | 20.2 | 24.8 | 4.5 |
| 133 | 5%-(9:1)-NPS6/PU1 | 5 | 6.4 | 19.8 | 26.1 | 53.8 | 3.5 |
| 134 | 5%-(9:1)-NPS3/PU1 | 5 | 11.5 | 16.8 | 20.8 | 29.1 | 2.5 |
| Comparative Example H | deionized water | | 16.0 | 55.4 | 66.3 | 70.3 | 1 |

TABLE 13

| EXAMPLE | COMPOSITION | pH | CONTACT ANGLE (INITIAL) | CONTACT ANGLE ($1^{ST}$ CYCLE) | CONTACT ANGLE ($2^{ND}$ CYCLE) | CONTACT ANGLE ($3^{RD}$ CYCLE) | CLEANING PERFORMANCE RATING AFTER $3^{RD}$ CYCLE |
|---|---|---|---|---|---|---|---|
| 135 | 5%-(95:5)-NPS2/PU1 | 5 | 20 | 31 | 34 | 38 | 3.5 |
| 136 | 5%-(9:1)-NPS2/PU1 | 2 | 9.2 | 23.0 | 32.6 | 33.8 | 3.5 |
| 137 | 5%-(85:15)-NPS2/PU1 | 5 | 11 | 25 | 27 | 32 | 3.5 |
| 138 | 5%-(70:30)-NPS2/PU1 | 5 | 13 | 26 | 28 | 29 | 3.5 |
| 139 | 5%-(60:40)-NPS2/PU1 | 5.5 | 21 | 28 | 32 | 50 | 2.5 |
| Comparative Example H | deionized water | | 16 | 55 | 66 | 70 | 1 |
| 140 | 5%-(9:1)-NPS2/PU1 | 10 | 46 | 58 | 61 | 63 | 3 |
| 141 | 5%-(9:1)-NPS2/PU1 | 8 | 21 | 33 | 32 | 36 | 3 |
| 142 | 5%-(9:1)-NPS2/PU1 | 5 | 22 | 28 | 33 | 33 | 3 |
| 143 | 5%-(9:1)-NPS2/PU1 | 3 | 10 | 24 | 30 | 34 | 3.5 |
| 144 | 5%-(9:1)-NPS2/PU1 | 1.5 | 10 | 26 | 30 | 38 | 3.5 |
| Comparative Example H | deionized water | | 16 | 55 | 66 | 70 | 1 |

TABLE 15

| EXAMPLE | COMPOSITION | pH | CONTACT ANGLE (INITIAL) | CONTACT ANGLE ($1^{ST}$ CYCLE) | CONTACT ANGLE ($2^{ND}$ CYCLE) | CONTACT ANGLE ($3^{RD}$ CYCLE) | CLEANING PERFORMANCE RATING AFTER $3^{RD}$ CYCLE |
|---|---|---|---|---|---|---|---|
| 145 | 5%-(9:1)-1115/R960 | 2 | 15 | 26 | 32 | 41 | 3.5 |
| 146 | 5%-(9:1)-1115/PS, PS1 | 2 | 13 | 33 | 37 | 42 | 3.0 |
| 147 | 5%-(9:1)-1115/A-PA2 | 2 | 10 | 33 | 42 | 51 | 3.5 |
| 148 | 5%-(9:1)-1115/A-PA1 | 2 | 10 | 33 | 45 | 45 | 3.0 |

TABLE 15-continued

| EXAMPLE | COMPOSITION | pH | CONTACT ANGLE (INITIAL) | CONTACT ANGLE (1$^{ST}$ CYCLE) | CONTACT ANGLE (2$^{ND}$ CYCLE) | CONTACT ANGLE (3$^{RD}$ CYCLE) | CLEANING PERFORMANCE RATING AFTER 3$^{RD}$ CYCLE |
|---|---|---|---|---|---|---|---|
| 149 | 5%-(9:1)-1115/PA3 | 2 | 23 | 39 | 43 | 50 | 3.5 |
| 150 | 5%-(9:1)-1115/R2180 | 2 | 15 | 37 | 42 | 42 | 4.0 |
| 151 | 5%-(9:1)-1115/R967 | 2 | 12 | 33 | 35 | 40 | 4.0 |
| Comparative Example H | deionized water | | 16 | 55 | 66 | 70 | 1 |

TABLE 16

| EXAMPLE | SUBSTRATE | COMPOSITION | pH | CLEANING PERFORMANCE RATING |
|---|---|---|---|---|
| 152 | TP5 | 5%-(9:1)-1115/R960 | 2 | 5 |
| 153 | TP6 | 5%-(9:1)-1115/R960 | 2 | 5 |
| 154 | TP5 | 5%-(7:3)-1115/R960 | 5 | 5 |
| 155 | TP6 | 5%-(7:3)-1115/R960 | 5 | 5 |
| 156 | TP5 | 5%-(9:1)-2326/R960 | 1.5 | 5 |
| 157 | TP6 | 5%-(9:1)-2326/R960 | 1.5 | 5 |
| 158 | TP5 | 5%-(4:1)-ST-UP/R960 | 6 | 2 |
| 159 | TP6 | 5%-(4:1)-ST-UP/R960 | 6 | 3 |
| Comparative Example I | TP5 | deionized water | | 1 |
| Comparative Example J | TP6 | deionized water | | 1 |

Examples 160-169

A disposable syringe (5 ml) was packed with glass wool followed by ion exchange resin. The packed bead bed was rinsed with deionized water (2×2 ml) before passing a 10 g solution of a composition through the resin bead until the noted pH (denoted IEX in Table 17). Alternatively, compositions were prepared by combination of the individual components and acidified with HCl (1.0 N) while mixing on a stirring plate with a magnetic stirrer (denoted HCl in Table 17). The samples were periodically monitored during storage at room temperature for stability or gelation. In Table 17 (below), S means readily flowable, G means gelled, and T means thickened thick

TABLE 17

| EXAMPLE | COMPOSITION | ACIDIFICATION METHOD | pH | APPEARANCE INITIAL | 13 DAYS |
|---|---|---|---|---|---|
| 160 | 5% (90:10)-NPS2/PU1 | IEX | 3 | S | S |
| 161 | 5% (80:20)-NPS2/PU1 | IEX | 3 | S | S |
| 162 | 5% (70:30)-NPS2/PU1 | IEX | 3 | S | S |
| 163 | 5% (60:40)-NPS2/PU1 | IEX | 3 | S | S |
| 164 | 5% (50:50)-NPS2/PU1 | IEX | 3 | S | S |
| 165 | 5% (50:50)-NPS2/PU1 | HCl | 5 | G | — |
| 166 | 5% (50:50)-NPS2/PU1 | HCl | 5.5 | T | G |
| 167 | 5% (50:50)-NPS2/PU1 | HCl | 6 | S | G |
| 168 | 10% (90:10)-NPS3/PU1 | IEX | 4 | S | S |
| 169 | 10% (90:10)-NPS3/PU1 | HCl | 4 | T | G |

All patents and publications referred to herein are hereby incorporated by reference in their entirety. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A composition comprising:
   an aqueous continuous liquid phase; and
   core-shell particles dispersed in the aqueous continuous liquid phase, each core-shell particle comprising a polymer core surrounded by a shell consisting essentially of nonporous spherical silica particles disposed on the polymer core, wherein the polymer core comprises at least one polymer, wherein a weight ratio of a total amount of the nonporous spherical silica particles in the composition to a total amount of the at least one polymer in the composition is in a range of from 85:15 to 95:5, wherein the nonporous spherical silica particles have a volume average particle diameter of 60 nanometers or less, and wherein the composition has a pH value of less than 5.

2. The composition of claim 1, wherein the polymer core comprises a film-forming thermoplastic polymer.

3. The composition of claim 2, wherein the film-forming thermoplastic polymer comprises a polyurethane segment.

4. The composition of claim 1, wherein the composition further comprises a surfactant.

5. The composition of claim 1, wherein the composition is free of acicular silica particles.

6. A method of making an article, the method comprising applying the composition of claim 1 to a surface of a substrate.

7. The method of claim 6, wherein the surface comprises at least one of glass, metal, fiberglass, or ceramic.

8. The method of claim 6, wherein the substrate is selected from the group consisting of shower surrounds, bathtubs, toilets, sinks, faucets, windows, and mirrors.

9. The method of claim 6, wherein the substrate comprises a painted surface or a clearcoat surface.

10. An article made by the method of claim 6.

11. A method comprising:
    combining a first aqueous dispersion comprising nonporous spherical silica particles and a second aqueous dispersion comprising polymer particles to provide an alkaline dispersion having a pH value greater than 7; and
    gradually acidifying the alkaline dispersion such that a major portion of the polymer particles are converted to core-shell particles thereby providing a core-shell particle dispersion, each core-shell particle comprising a polymer core surrounded by a shell consisting essentially of nonporous spherical silica particles disposed on the polymer core, wherein the nonporous spherical silica particles have a volume average particle diameter of 60 nanometers or less.

12. The method of claim 11, wherein the core-shell particle dispersion contains less than 0.1 percent by weight of acicular silica particles based on a total weight of the core-shell particle dispersion.

13. The method of claim 11, wherein the core-shell particle dispersion is free of acicular silica particles.

14. The method of claim 11, further comprising contacting the composition with a protonated cation exchange resin.

* * * * *

UNITED STATES PATENT AND TRADEMARK OFFICE
CERTIFICATE OF CORRECTION

PATENT NO. : 8,633,263 B2
APPLICATION NO. : 13/201288
DATED : January 21, 2014
INVENTOR(S) : Naiyong Jing Page 1 of 1

It is certified that error appears in the above-identified patent and that said Letters Patent is hereby corrected as shown below:

In the Specification

<u>Column 5</u>
Lines 37-38, Delete "di-tallowedimethylammonium" and insert -- di-tallowdimethylammonium --, therefor.

<u>Column 12</u>
Line 63, Delete "percent" and insert -- 5 percent --, therefor.

<u>Column 14</u>
Line 28, Delete "102" and insert -- 102. --, therefor.

Signed and Sealed this
Twenty-sixth Day of August, 2014

Michelle K. Lee
*Deputy Director of the United States Patent and Trademark Office*